United States Patent
Bottomley et al.

(10) Patent No.: US 7,995,641 B2
(45) Date of Patent: Aug. 9, 2011

(54) METHOD AND APPARATUS FOR CODE POWER PARAMETER ESTIMATION FOR RECEIVED SIGNAL PROCESSING

(75) Inventors: Gregory E. Bottomley, Cary, NC (US); Douglas A. Cairns, Durham, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 874 days.

(21) Appl. No.: 11/935,840

(22) Filed: Nov. 6, 2007

(65) Prior Publication Data

US 2009/0116455 A1    May 7, 2009

(51) Int. Cl.
   *H04B 1/00*   (2006.01)
(52) U.S. Cl. ......... 375/150; 375/142; 370/335; 370/342
(58) Field of Classification Search .................. 375/130, 375/142, 147, 150; 370/335, 342
See application file for complete search history.

(56) References Cited

U.S. PATENT DOCUMENTS

| | | | |
|---|---|---|---|
| 6,005,887 A | 12/1999 | Bottomley et al. | |
| 6,285,861 B1 | 9/2001 | Bonaccorso et al. | |
| 6,501,788 B1 | 12/2002 | Wang et al. | |
| 6,738,020 B1 | 5/2004 | Lindskog et al. | |
| 6,801,565 B1 | 10/2004 | Bottomley et al. | |
| 6,822,998 B1 * | 11/2004 | Yun et al. | 375/130 |
| 6,993,002 B2 * | 1/2006 | Pan et al. | 370/335 |
| 7,307,975 B2 * | 12/2007 | Tyra et al. | 370/335 |
| 7,493,131 B2 * | 2/2009 | Sih et al. | 455/522 |
| 2003/0099216 A1 | 5/2003 | Nilsson et al. | |
| 2004/0017311 A1 | 1/2004 | Thomas et al. | |
| 2004/0030534 A1 | 2/2004 | Thomas et al. | |
| 2004/0052305 A1 | 3/2004 | Olson et al. | |
| 2004/0146093 A1 | 7/2004 | Olson et al. | |
| 2004/0151238 A1 | 8/2004 | Masenten | |
| 2005/0078742 A1 | 4/2005 | Cairns et al. | |
| 2005/0111528 A1 | 5/2005 | Fulghum et al. | |
| 2005/0201447 A1 | 9/2005 | Cairns et al. | |

(Continued)

FOREIGN PATENT DOCUMENTS

WO   2004/036811   4/2004

(Continued)

OTHER PUBLICATIONS

Fulghum T., et al.: "Low Complexity Parameter Estimation for the Multi-antenna Generalized Rake Receiver", IEEE Vehicular Technology Conference, Jan. 1, 2006, 1874-1878, XP002430340.

(Continued)

*Primary Examiner* — Jean B Corrielus
(74) *Attorney, Agent, or Firm* — Coats & Bennett, PLLC

(57) ABSTRACT

As taught herein channelization code power estimates are generated for a number of data channels in a received CDMA signal based on a joint determination process. Joint processing in this context yields improved estimation of data channel code powers and corresponding estimations of noise variance. These improvements arise from exploitation of joint processing of measured data value correlations across two or more data channel codes represented in the received signal. In one or more embodiments, joint determination of data channel code powers comprises forming a correlation matrix as a weighted average of correlations determined for a plurality of data channels. In one or more other embodiments, joint determination of data channel code powers comprises jointly fitting the correlation matrices for a plurality of data channels in a least squares error estimation process.

24 Claims, 6 Drawing Sheets

U.S. PATENT DOCUMENTS

| | | | |
|---|---|---|---|
| 2005/0215218 | A1 | 9/2005 | Bottomley et al. |
| 2006/0007990 | A1 | 1/2006 | Cozzo et al. |
| 2006/0126568 | A1 | 6/2006 | Pan et al. |
| 2006/0182204 | A1 | 8/2006 | Cairns et al. |
| 2006/0268962 | A1 | 11/2006 | Cairns et al. |
| 2007/0047628 | A1 | 3/2007 | Fulghum et al. |
| 2007/0098048 | A1 | 5/2007 | Cairns et al. |
| 2007/0189364 | A1 | 8/2007 | Wang et al. |
| 2008/0123611 | A1* | 5/2008 | Wang et al. .......... 370/342 |
| 2009/0201905 | A1* | 8/2009 | Kwak et al. .......... 370/342 |
| 2009/0238152 | A1* | 9/2009 | Hans et al. .......... 370/335 |
| 2010/0074242 | A1* | 3/2010 | Kim et al. .......... 370/342 |

FOREIGN PATENT DOCUMENTS

WO          2004/036812          4/2004

OTHER PUBLICATIONS

3GPP TS 25.211, V6.7.0 (Dec. 2005). 3rd Generation Partnership Project; Technical Specification Group Radio Access Network; Physical Channels and Mapping of Transport Channels onto Physical Channels (FDD) (Release 6). Available at: http://www.3gpp.org/ftp/Specs/archive/25_series/25.211/.

3GPP TS 25.213, V6.3.0 (Jun. 2005). 3rd Generation Partnership Project; Technical Specification Group Radio Access Network; Spreading and Modulation (FDD) (Release 6). Available at: http://www.3gpp.org/ftp/Specs/archive/25_series/25.213/.

3GPP TS 25.214, V6.6.0 (Jun. 2005). 3rd Generation Partnership Project; Technical Specification Group Radio Access Network; Physical Layer Procedures (FDD) (Release 6). Available at: http://www.3gpp.org/ftp/Specs/archive/25_series/25.214/.

Co-pending U.S. Appl. No. 11/739,129, filed Apr. 24, 2007.

Co-pending U.S. Appl. No. 11/566,756, filed Dec. 5, 2006.

Grant, Stephen et. al., "Per-Antenna-Rate-Control (PARC) in Frequency Selective Fading with SIC-GRAKE Receiver", Vehicular Technology Conference IEEE 60th, Fall 2004, pp. 1458-1462, vol. 2.

Ringström, Markus et. al., "On Closed Loop Transmit Diversity for HSDPA", Vehicular Technology Conference IEEE 61st, Spring 2005, pp. 344-348, vol. 1.

Cairns, Douglas and Bottomley, Gregory E., "Method and Apparatus for Interference Estimation in a Generalized Rake Receiver." Jun. 30, 2006, U.S. Appl. No. 11/479,483.

Jatunov, Loran A. and Madisetti, Vijay, K., "Closed-Form for Infinite Sum in Bandlimited CDMA." IEEE Communications Letters, Mar. 2004, pp. 138-140, vol. 8, No. 3.

Co-pending U.S. Appl. No. 11/751,109, filed May 21, 2007.

Affes, S. et al. "Interference Subspace Rejection: A Framework for Multiuser Detection in Wideband CDMA." IEEE Journal on Selected Areas in Communications, vol. 20, No. 2, Feb. 2002, pp. 287-302.

Ghauri, I. et al. "Blind Channel Identification and Projection Receiver Determination for Multicode and Multirate Situations in DD-CDMA Systems." In Proc. IEEE Intl. Conf. Acoustics, Speech and Sig. Proc. (ICASSP), Salt Lake City, UT, USA, May 7-11, 2005, pp. 2197-2200.

Hansen, H. et al. "High Capacity Downlink Transmission with MIMO Interference Subspace Rejection in Multicellular CDMA Networks." EURASIP Journal on Applied Signal Processing, 2004:5, pp. 707-726.

Madkour, Mohamed F. et al. "Successive Interference Cancellation Algorithms for Downlink W-CDMA Communications." IEEE Transactions on Wireless Communications, vol. 1, No. 1, Jan. 2002, pp. 169-177.

Zhang, Q. T. et al. "A Unified Approach to Multirate Detection for Cellular Systems in Fast-Fading Channels." IEEE Trans. Wireless Communications, vol. 2, pp. 1702-1710. (Sep. 2004).

Co-pending U.S. Appl. No. 11/739,126, filed Apr. 24, 2007.

* cited by examiner

| | SPREADING FACTOR | NUMBER OF DATA CODES | RELATIVE CODE AMPLITUDE |
|---|---|---|---|
| TFC1 | 8 | 1 | $\beta_1$ |
| TFC2 | 4 | 1 | $\beta_2$ |
| TFC3 | 4 | 2 | $\beta_3$ |

*FIG. 4*

METHOD AND APPARATUS FOR CODE POWER PARAMETER ESTIMATION FOR RECEIVED SIGNAL PROCESSING

BACKGROUND

1. Technical Field

The present invention generally relates to communication networks, such as wireless communication networks, and particularly relates to estimation of channelization code powers for received signal processing.

2. Background

With code-based channelization, e.g., Code Division Multiple Access (CDMA), a received signal represents a composite of individually coded signals. A given individual signal of interest is recovered at the receiver by correlating the received composite signal with the individual signal's spreading code. In general, spreading codes are taken from an orthogonal set of spreading codes, e.g., length-16, length-32, or length-64 Walsh codes. Under ideal reception conditions, the use of orthogonal spreading codes enables the receiver to recover an individual signal of interest from the composite signal that is free from interference caused by the other signals encoded within the composite signal. Of course, for a number of reasons well understood in the art, real-world signal reception and despreading are compromised by a range of signal impairments, including various forms of interference.

As one example of interference arising under practical conditions, real-world wireless communication transmitters commonly transmit signals over dispersive channels. Time dispersion in multipath propagation environments results in at least partial loss of code orthogonality. Orthogonality losses mean that the individual signals are no longer perfectly separated mathematically via correlation processing at the receiver, and the consequent non-zero correlations between the individually coded signals represent a potentially significant source of interference.

As another example, transmissions from adjacent transmitters, e.g., neighboring base stations in a wireless communication network, may use the same spreading codes and therefore interfere with one another. Similar reuse problems arise in Multiple-Input-Multiple-Output (MIMO) transmission scenarios, where channelization code reuse across transmit antennas may be used. As a further example, the use of non-orthogonal (long) scrambling codes between transmitters in wireless communication networks represents an additional source of interference that compromises despreading performance.

Estimating code cross-correlations therefore represents a useful aspect of interference estimation and suppression in CDMA receivers. In turn, estimating the power allocations for channelization codes represents one aspect of determining code correlations. Details relating to certain aspects of code power estimation associated with correlation estimation processing appear in the commonly owned U.S. Pat. No. 7,590,167, which issued on 15 Sep. 2009. The '167 patent is entitled, "A Method and Apparatus for QAM Demodulation in a Generalized RAKE Receiver," and was filed on 30 Aug. 2005 and assigned application Ser. No. 11/215,584. The '167 patent presents certain aspects of code power estimation as part of "Generalized Rake" (G-Rake) receiver processing, where a correlation fitting procedure was used to estimate code powers.

Further code power estimation information appears in the commonly owned U.S. Pat. No. 7,751,463, which issued on 6 Jul. 2010. The '463 patent is entitled, "Method and Apparatus for Suppressing Interference Based on Channelization Code Power Estimation with Bias Removal," and was filed on 5 Dec. 2006 and assigned application Ser. No. 11/566,756. Within the context of the '463 patent, Rake-combined values, i.e., the weighted combination of signal samples from plural Rake fingers, provide the basis for estimating code power allocations.

While offering certain advantages at least within specific contexts, it is fair to state that the above examples of known processing approaches to code power estimation do not exploit the potential estimation improvements achievable with the incorporation of joint estimation techniques, nor do they provide a "complete" solution, at least with respect to some processing contexts. For example, certain types of Linear Multi-User-Detection (LMUD) receivers depend on the estimation of received signal amplitudes (for the individual components of a composite signal) and corresponding received signal noise variance, which represents the effect of passing white noise through the received signal digital filtering process.

SUMMARY

As taught herein channelization code power estimates are generated for a number of data channels in a received CDMA signal based on a joint determination process. Application of joint processing in this context yields improved, e.g., lower-noise and/or more accurate, estimation of data channel code powers and corresponding estimations of noise variance. These improvements arise from exploitation of joint processing of measured data value correlations across two or more data channel codes represented in the received signal.

In one or more embodiments, a method of estimating channelization code powers for a received CDMA signal comprises despreading the received CDMA signal using one or more channelization codes used for data signals in the received CDMA signal to obtain despread data values for each of the one or more channelization codes, measuring correlations between the despread data values for each of the one or more channelization codes, and jointly determining channelization code power estimates for at least two channelization codes used in the received CDMA signal based on the measured correlations.

In at least one such embodiment, measuring correlations between the despread data values for each of the one or more channelization codes comprises determining matrices of data correlations for each of a plurality of data channel codes over one or more time slots. Correspondingly, jointly determining channelization code power estimates for at least two channelization codes used in the received CDMA signal based on the measured correlations comprises jointly fitting the matrices of data correlations in a least squares estimation process to determine code power estimates corresponding to the plurality of data channel codes.

In another embodiment, jointly determining channelization code power estimates for at least two channelization codes used in the received CDMA signal based on the measured correlations comprises forming a weighted average from the measured correlations determined for two or more channelization codes, and determining the channelization code power estimates based at least in part on the weighted average. The method may further comprise determining weights for forming the weighted average based on knowledge of relative channelization code power allocations for the two or more channelization codes.

The above embodiments, or variations of them, may be implemented at a base station, e.g., a Wideband CDMA base station, and applied to uplink processing. For example, such processing is advantageous in improving interference suppression in the detection of data transmissions from high-speed users on the uplink. Additionally, or alternatively, joint determination of data channel code powers may be implemented at a wireless communication device, e.g., a mobile station in a wireless communication network, and applied to downlink processing. For example, such processing is advantageous in improving interference suppression in the detection of data transmissions for HSDPA or other high-speed data services.

Of course, the present invention is not limited to the above contexts, nor is it limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a table of scaling factors useful in one or more method embodiments of determining channelization code powers.

DETAILED DESCRIPTION

Figure 1:
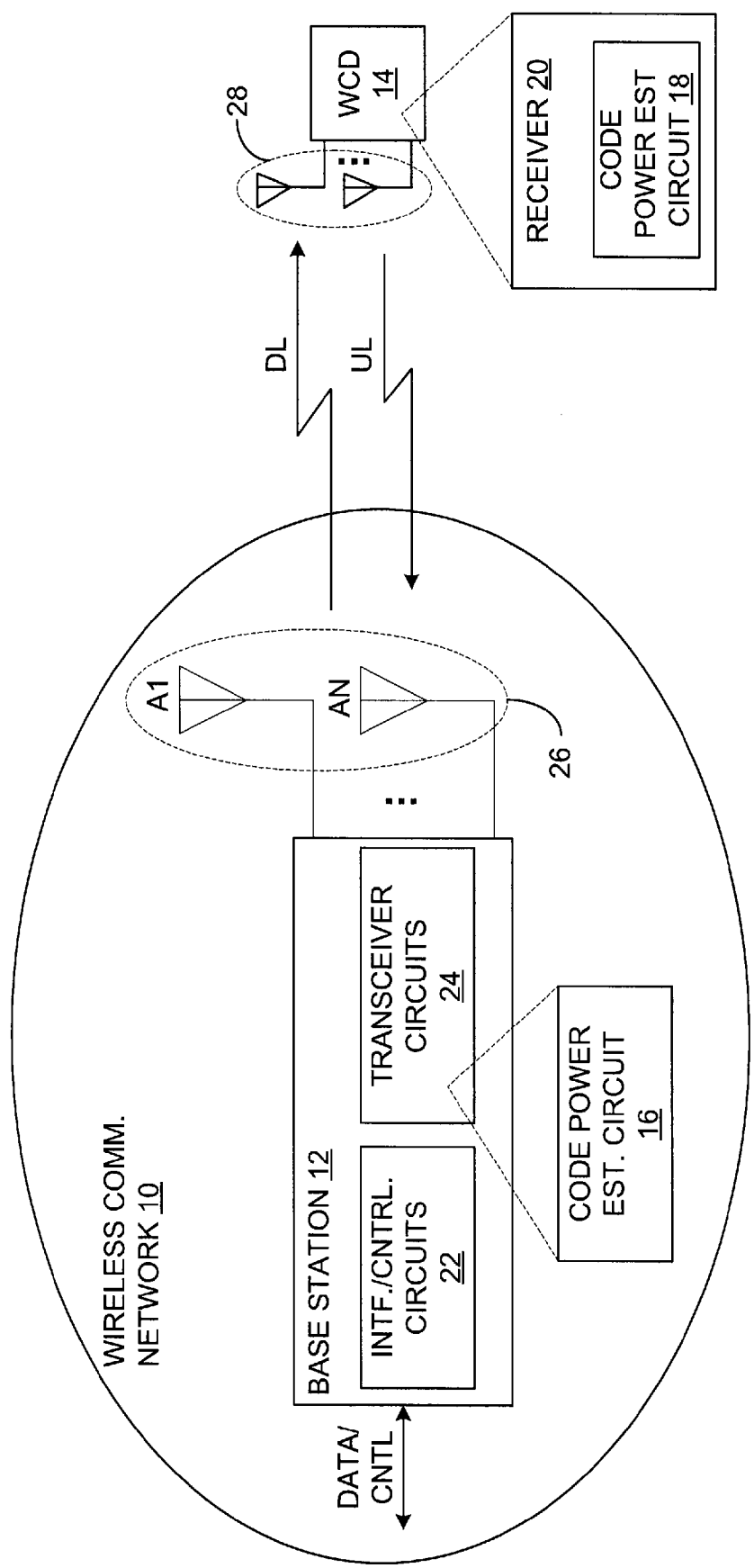
FIG. 1 is a block diagram of a wireless communication network including an embodiment of a base station for supporting communications with a wireless communication device, where one or both the base station and wireless communication device are configured for estimation of channelization code powers via joint determination processing as taught herein.

FIG. 1 presents a simplified illustration of one embodiment of a wireless communication network 10, that includes a base station 12 configured to support downlink and uplink communications with a plurality of wireless communication devices 14, with just one such base station and device shown for simplicity. As a non-limiting example, the base station 12 and the wireless communication device 14 are configured to support relatively high-rate data communication, such as High Speed Downlink Packet Access (HSDPA) downlink services and/or High Speed Uplink Packet Access (HSUPA) uplink services according to the Wideband Code Division Multiple Access (WCDMA) standard. Such services are referred to herein using the term high speed packet access (HSPA), which can denote either uplink or downlink.

To that end, the base station 12 includes a code power estimation circuit 16 for estimating the allocations of transmission power to the codes represented in the composite uplink signals it receives. Additionally, or alternatively, the wireless communication device 14 includes a code power estimation circuit 18, which may be implemented as part of a receiver 20 included in the wireless communication device 14. Thus, it should be understood that code power estimation as taught herein can be applied to uplink received signal processing and/or to downlink received signal processing, with the code power estimation circuit 16 being one non-limiting example of the former application, and the code power estimation circuit 18 being one non-limiting example of the latter application. As such, operation of the code power estimation circuit 16 may be tailored for uplink signals while operation of the estimation circuit 18 may be tailored for downlink signals.

However, as taught herein, either circuit is configured to produce estimates of channelization code powers for two or more channelization codes represented in a received CDMA signal. These code power estimates may be expressed as code power scale factors, where each scale factor relates the relative power allocation of the corresponding data code to a pilot code power. Estimated channelization code powers held in working memory after their determination are useful, for example, in interference suppression and other received signal processing operations. Thus, if included in the base station 12, the code power estimation circuit 16 generates code power estimates for channelization codes used in a CDMA signal received on the uplink, and, if included in the wireless communication device 14, the code power estimation circuit 18 generates code power estimates for channelization codes used in a CDMA signal received on the downlink.

In more detail, the base station 12 includes interface/control circuits 22, which provide overall communication and operational control, as well as interfacing to other network entities for the transfer of user data to/from targeted ones of the wireless communication devices 14, and various control and signaling information. Transceiver circuits 24, including signal processing and radiofrequency (RF) transmit/receive circuits, process user data (traffic) and control signals for transmission by spreading the individual signals using orthogonal and/or quasi-orthogonal spreading codes within a defined code tree, e.g., a set of Walsh codes. The resulting composite CDMA signal(s) are transmitted from one or more antennas 26 on the downlink, e.g., Multiple-Input-Multiple-Output (MIMO) transmission may be used.

For uplink reception at the base station 12, the code power estimation circuit 16 may be used to perform code power estimation for uplink CDMA signals received from the wireless communication device 14. Similarly, the wireless communication device 14, which may be a cellular radiotelephone, pager, PDA, computer, modem or other network access card, etc., includes a wireless receiver 20, which processes the CDMA signals received from the base station 12 on its one or more antennas 28. The estimation circuit 18, if implemented at the wireless communication device 14, therefore may be used to estimate channelization code powers for these downlink CDMA signals.

In a non-limiting example, the receiver 20 comprises a Linear Multi-User Detection (LMUD) receiver. In at least one LMUD embodiment, the receiver 20 is configured such that the multi-user detection processing represents a second processing stage, preceded by Rake processing wherein the received signal is Rake processed to produce Rake-combined (despread) values. These Rake combined values are processed over multiple channelization codes and symbol periods in an LMUD process to produce received symbol estimates.

In this context, a vector of Rake combined values can be expressed as $$z = RAs + n \qquad \text{Eq. (1)}$$

where $s=(s_0, s_1, \ldots, s_{K-1})^T$ is a vector of received symbols to be considered for joint detection, and $A=\text{diag}(A_0, A_1, \ldots,$ $A_{K'-1})^T$ is a diagonal matrix with the $k^{th}$ element corresponding to the received amplitude for $S_k$. The elements of R are the cross-correlations of the effective spreading waveforms of the symbols in s with themselves. The element relating $Z_{n_0}$ with $S_{n_1}$ is given by $$R(n_0, n_1) = \int_{-\infty}^{\infty} f_{n_0}^H(t) f_{n_1}(t) dt, \quad \text{Eq. (2)}$$

where $f_n(t)=[f_{n,0}(t), f_{n,1}(t), \ldots, f_{n,Q-1}(t)]^T$ is the effective waveform for symbol n, with each element corresponding to each receive antenna q. Here, Q is the number of receive antennas. The effective waveform considered is a combination of transmit waveform, radio channel impulse response, and receive filtering which includes receive chip filtering, despreading, and Rake combining. It can be shown that $N_0R$ is the covariance matrix of the noise vector n, where $N_0$ is the noise variance at the input of the Rake receiver circuitry implemented within the receiver 20.

Given the Rake combined values z, the LMUD implementation contemplated for one or more embodiments of the receiver 20 provides Minimum Mean Square Error (MMSE) symbol estimates via $$\hat{s}_{MMSE} = AM^{-1}z, \quad \text{Eq. (3)}$$

where the matrix M is given by $$M = RA^2 + N_0 I. \quad \text{Eq. (4)}$$

LMUD processing may employ "sliding window" techniques, where the symbols for K users are jointly detected over 2N+1 symbol periods (K'=(2N+1)K). The "middle" K symbols (or a subset thereof) are of interest to the receiver 20, from which the desired user symbols are extracted and decoded.

One sees from Eq. (3) and Eq. (4) that the above LMUD processing depends directly on the matrix A and the noise variance $N_0$. As defined above, the diagonal elements of $A^2$ represent the code powers of the symbols transmitted by the base station 12. These code powers as well as the noise variance generally are unknown by the wireless communication device 14, so they must be estimated. The estimation of these unknown parameters may be advantageously performed by the code power estimation circuit 18.

From the '167 patent mentioned in the background of this application, it is known to estimate a data correlation matrix of one or more code channels represented in a received CDMA signal, and then use that estimate to construct a least squares problem from $$\hat{R}_d \approx \alpha R_1(\tilde{g}) + N_0 R_n + \gamma \tilde{h} \tilde{h}^H. \quad \text{Eq. (1)}$$

In Eq. (1), $R_1(\tilde{g})$ is the intra-cell interference due to radio (medium) channel g scaled by the square-root of the per-symbol pilot channel energy $E_p$, $R_n$ captures the effect of white noise passing through the receive filter, and $\tilde{h}\tilde{h}^H$ is the outer product of the net coefficients scaled by the square-root of the per-symbol pilot channel energy (i.e. $\tilde{h}=\sqrt{E_p}h$). The parameters $\alpha$, $N_0$, and $\gamma$ are the receiver parameters that are estimated by fitting the right hand side of Eq. (1) to the left hand side of Eq. (1) using a least squares approach. This fitting can be achieved by stacking the columns of the respective matrices into vectors, and then forming the following problem $$Ax = b, \quad \text{Eq. (2)}$$

where $$A = [\text{vec}(R_1(\tilde{g})) \quad \text{vec}(R_n) \quad \text{vec}(hh^H)] \quad \text{Eq. (7)}$$

$$b = \text{vec}(\hat{R}_d)$$

$$x = [\alpha \quad \beta \quad \gamma]^T,$$

and vec(Q) denotes the operation of stacking the columns of matrix Q into a vector. With these definitions, the least squares estimate for the receiver parameters is given by $$x = (A^H A)^{-1} A^H b. \quad \text{Eq. (4)}$$

In comparison with code power estimation as taught herein, which uses one or more forms of joint estimation processing, the approach represented in the '167 patent provides single, potentially noisy, estimates of $\hat{\alpha}$, $\hat{N}_0$, and $\hat{\gamma}$ from which the estimated total impairment correlation matrix, $\hat{R}_u$, can be constructed as $\hat{R}_u = \hat{\alpha} R_1(\hat{g}) + \hat{N}_0 R_n$. The matrix $\hat{R}_u$ can be used for obtaining G-Rake combining weights, and the code power estimate $\hat{\gamma}$ can be used as the data-to-pilot power ratio for decoding purposes.

One embodiment of joint estimation as applied herein to the estimation of channel code powers provides multiple $N_0$ estimates that can be averaged to obtain a better overall estimate of $N_0$. In another embodiment, joint estimation provides a more complete system model that leads to a joint solution for the diagonal elements of $A^2$ and $N_0$. This more comprehensive joint solution improves estimation accuracy for both $A^2$ and $N_0$. Moreover, the approaches taught herein directly encompass multiple base stations 12.

In more detail, one can show that a practical LMUD implementation for the receiver 20 implements the following form of equation Eq. (4)

$$M = \tilde{R} \tilde{A}^2 + \sigma^2 I. \quad \text{Eq. (9)}$$

Here, $\tilde{R}$ indicates that the waveform correlation matrix is a function of the pilot channel power used for estimating channel coefficients. Therefore, the pilot channel power factor must be absorbed by the code power term in order to keep the overall result consistent. Taking the pilot scaling into account, one can write the diagonal elements of $\tilde{A}^2$ as either $$\tilde{A}_k^2 = \frac{E_{d,k}^j}{E_p^j} = \gamma_k^j, \quad \text{Eq. (10)}$$

or $$\tilde{A}_k^2 = \frac{\gamma_k^j}{K}, \quad \text{Eq. (11)}$$

depending upon the convention adopted by the receiver 20 (e.g., whether $\gamma_k^j$ is related to individual code power or to the sum power of a group of K codes). In either instance, the value of $\tilde{A}_k^2$ is seen to be equal to or proportionate to the code power estimate $\gamma_k^j$ which as noted before expresses the code power estimate for the $k^{th}$ code as a power scale factor relative to pilot code power.

Assuming the wireless communication device 14 demodulates the $j^{th}$ base station of J total base stations, then $E_p^j$ represents the pilot symbol energy for the $j^{th}$ base station, $E_{d,k}^j$ is the data symbol energy for code k (out of K codes) for the $j^{th}$ base station, and $\gamma_k^j$ represents the data-to-pilot symbol power ratio for the $k^{th}$ code of the $j^{th}$ base station. That is, $\gamma_k^j$ is a channelization code power estimate for the $k^{th}$ code of the $j^{th}$ base station, expressed in relation to the power of the pilot.

The data correlation matrix for the $k^{th}$ code of base station j can be written as $$R_{d,k}^j = \sum_{q=0}^{J-1} \alpha^q R_I(\tilde{g}^q) + N_0 R_n + \gamma_k^j \tilde{h}^j (\tilde{h}^j)^H. \quad \text{Eq. (12)}$$

In Eq. (12), $\alpha^q$ is the total energy per chip of base station q divided by per-symbol energy of the pilot for base station q (i.e. $\alpha^q = E_c^q / E_p^q$); $\tilde{g}^q$ is a vector of medium (i.e. radio) channel coefficients between base station q and the wireless communication device 14 scaled by the pilot channel power (i.e. $\tilde{g}^q = \sqrt{E_p^q} \, g^q$); $R_I(\tilde{g}^q)$ is an interference matrix that depends upon whether the interference is own-cell or other-cell; $R_n$ is a matrix that captures the effect of the receive filter implemented in receiver 20 on white noise; $N_0$ represents the power of the white noise passing through the receive filter; $\tilde{h}^j$ is a vector of net channel coefficients scaled by the pilot channel amplitude corresponding to the overall channel between the $j^{th}$ base station 12 and the wireless communication device 14 that includes the contribution of transmit filtering at the $j^{th}$ base station 12, the radio channel, and the receive filter.

Correlation fitting requires a measurement of $R_{d,k}^j$ so that Eq. (12) may be used to formulate a least squares problem. Assuming slot-based processing, an estimate of the data correlation matrix for despread data values on the $k^{th}$ code may be formed as, $$\hat{R}_{d,k}^j = \frac{1}{2560/SF} \sum_{m=0}^{(2560/SF)-1} x_k^j(m) x_k^j(m)^H, \quad \text{Eq. (13)}$$

where, $x_k^j(m)$ is a vector of despread data values from the $j^{th}$ base station for the $k^{th}$ code during the $m^{th}$ symbol time and SF is the spreading factor of the data channel defined by the $k^{th}$ channelization code. Taking the measurement of $R_{d,k}^j$ from Eq. (13) and substituting into Eq. (12) yields the following expression, $$\hat{R}_{d,k}^j \approx \sum_{q=0}^{J-1} \alpha^q R_I(\tilde{g}^q) + N_0 R_n + \gamma_k^j \tilde{h}^j (\tilde{h}^j)^H, \quad \text{Eq. (14)}$$

where $\approx$ denotes approximately equal. The code power estimation circuit 18 in the receiver 20 can be configured to implement Eq. (14) to construct one or more least squares problems to solve for the unknown parameters (i.e. [$\alpha^0, \alpha^1, \ldots, \alpha^{J-1}, N_0, \gamma_k^j$]) for the downlink signal(s) received from one or more base stations 12. As the matrices in Eq. (14) are Hermitian symmetric, only the upper or lower triangle need to be computed. Subsets of these elements may be used instead of the whole matrix. (Note that the code estimation circuit 16 at the base station 12 may be configured for similar processing, as applied to received uplink signals.)

In one non-limiting example for an LMUD implementation of the receiver 20, the wireless communication device 14 is configured as a WCDMA terminal compatible with the HSPA mode of WCDMA. As those skilled in the art understand, the HSPA mode involves allocating a (scheduled) user K-D spreading codes. Supporting LMUD processing in this context requires the receiver 20 to estimate which codes are active—i.e., which codes in the set of spreading codes are being used for the HSPA services—and calculate the corresponding code powers, e.g., expressed as power scale factors, and the noise variance. Alternatively, the receiver 20 can compute all the power scale factors and corresponding noise variance.

The teachings herein related to joint estimation of channelization code powers may be practiced either way. In one embodiment, K scale factors are estimated. Also, while Eq. (14) generally leads to a J+2 dimensional least squares problem, the receiver 20 may be configured to model the J-1 other cells (downlink) as white noise. Similar simplifications may be adopted at the base station 12, where code power estimation for the uplink can be simplified by, for a given high-speed user of interest, modeling other high-speed users as white noise. Thus, processing at the wireless communication device 14 (or at the base station 12) may assume that the $0^{th}$ wireless network cell (or user) is the serving cell (or user of interest).

In one particular example embodiment, the joint estimation of code powers exploits knowledge of the relation between at least some of the channelization code powers of interest. For example, it may be known that a certain subset of channelization codes are all allocated the same power. More generally, the relative power allocations for two or more channelization codes may be known. Thus, the code power estimate for one code may be determined by knowing the code power for another code and the relative power relationship.

Figure 2:
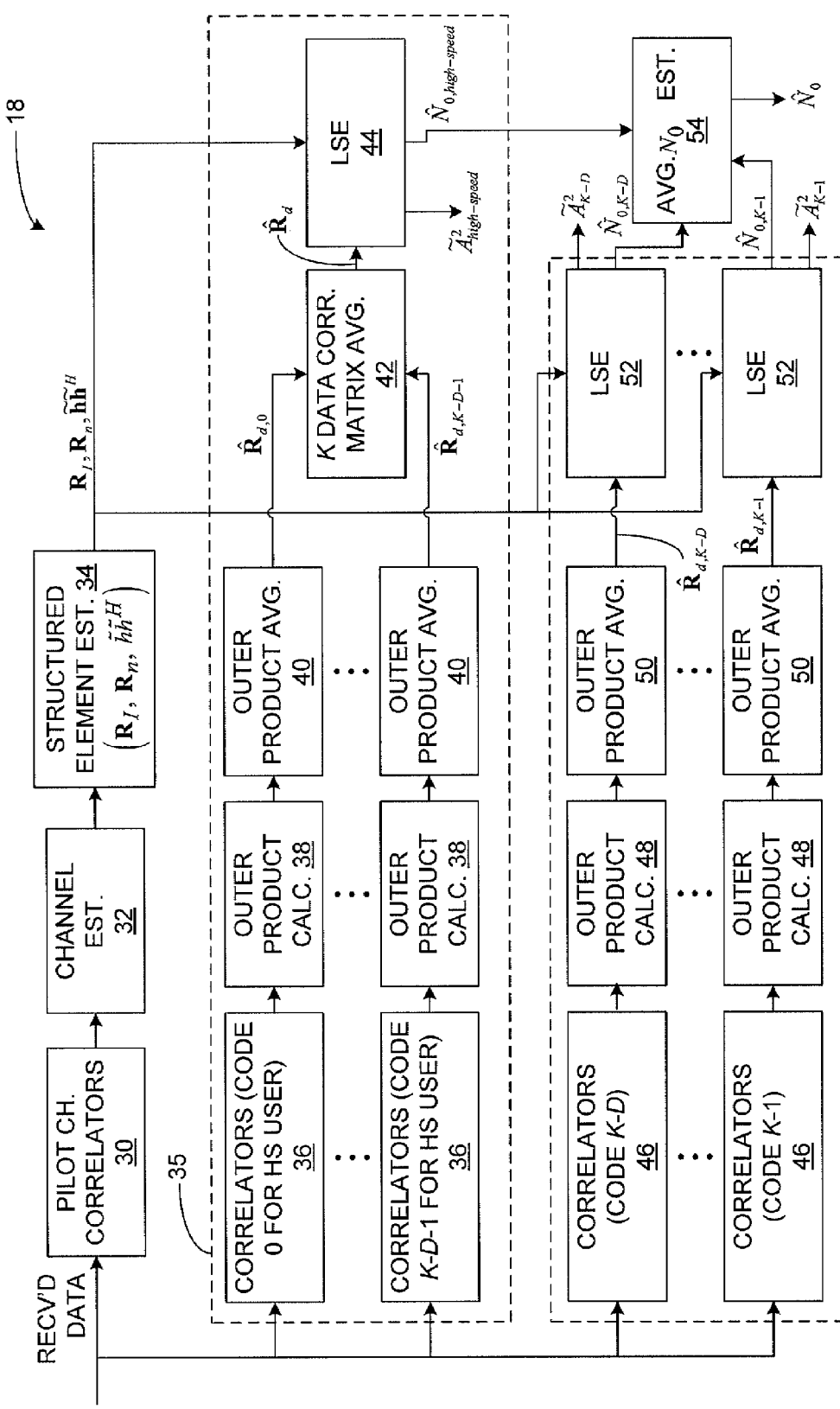
FIG. 2 is a block diagram of one embodiment of a communication receiver, or at least a portion thereof, such as may be implemented, for example, in the wireless communication device and/or base station of FIG. 1 for joint determination of channelization code powers.

FIG. 2 provides example details, set in the context of the code power estimation circuit 18 of receiver 20 in the wireless communication device 14. As such, the illustrated processing circuits operate on downlink received signals, but it should be understood that similar circuitry can be implemented as part of or in association with the code power estimation circuit 16 of the base station 12. Also, note that FIG. 2 and variations of the illustrated processing architecture may be implemented in hardware, software, or any combination thereof.

In one embodiment, at least a portion of the illustrated processing circuits are implemented in one or more baseband processors, which may comprise general or special purpose digital signal processors, or other digital processing circuits relying on hardware and/or software driven processing implementations. Finally, it is assumed that the wireless communication device 14 is configured as a WCDMA-based communications terminal supporting HSPA services, where the wireless communication device is a high-speed data user that is allocated on a scheduled basis some or all of the set of spreading codes dedicated for high-speed services. Further, it is assumed that the "RECV'D DATA" signal incoming from the left represents digitized samples of a received composite CDMA signal having multiple channelization code signals within it.

Received signal samples are provided to pilot channel correlators 30, e.g., Common Pilot Channel (CPICH) correlators, which generate despread pilot channel values. In turn, a channel estimator 32 generates propagation channel estimates from the despread pilot channel values. Those channel estimates are then used by a structured element estimator 34 to generate estimates of the structured elements used to model received signal impairments, including an interference covariance matrix $R_I$, a noise covariance matrix $R_n$, and a net channel outer product term $\hat{h}\hat{h}^H$.

Further, a circuit block 35 includes sets of correlators 36, outer product calculators 38, and outer product averaging circuits 40, for each channelization code assigned to the wireless communication device 14 for HSPA services (CODE 0 through CODE K-D-1). The circuit block 35 further includes an averaging circuit 42, which is configured to jointly determine the data correlation estimation matrix $\hat{R}_d$ using the per-code correlation estimates for high-speed service codes 0 through K−D−1, as provided by the outer product averaging circuits 40. Finally, with respect to the circuit block 35, a least squares error (LSE) estimator 44 performs a least squares fitting using the jointly determined $\hat{R}_d$ matrix. The LSE estimator 44 generates as its output the values $\tilde{A}_{high\text{-}speed}^2$ and $\hat{N}_{0,high\text{-}speed}$, for the spreading codes allocated to the high-speed services.

Another circuit block 45 includes circuitry to handle code power estimation for any spreading codes left in the composite signal for which the receiver 20 does not know the power allocations or relative power relationships. Note that here and elsewhere, code power may be estimated for specific spreading codes or for a given level of a code tree such that the code power estimate for a given code branch represents code power allocated at that branch level, or a total of code power allocations made below that branch level for that given branch. For example, code power may be estimated for a length-16 Walsh code, or may be estimated for a length-16 branch in a Walsh code tree, from which multiple longer-length child codes are derived, e.g., two length-32, four length-64, or so on.

In any case, the circuit block 45 includes sets of correlators 46, outer product calculators 48, outer product averaging circuits 50, and corresponding LSE estimators 52. These circuits operate as above, but for the remaining codes not used for high-speed services. The outputs from the LSE estimator 44, and the LSE estimators 52 operate as inputs to an estimation circuit 54, which generates an average estimate of $\hat{N}_0$. This average estimate represents an improved, lower-noise estimate than the single-shot estimates generated in conventional approaches.

Figure 3:
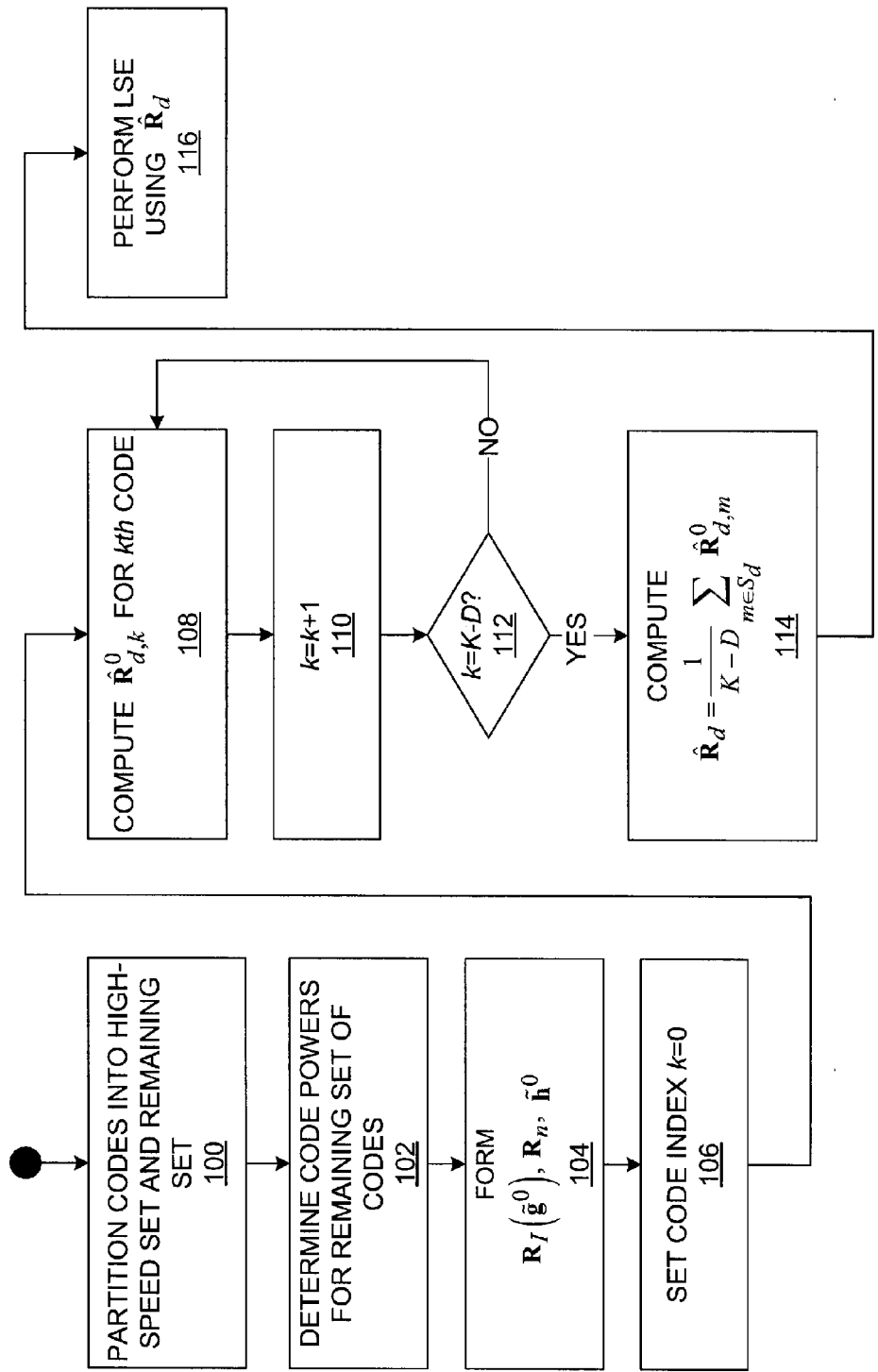
FIG. 3 is a logic flow diagram for one embodiment of joint determination of channelization code powers.

With the above circuitry in mind as a non-limiting example for supporting downlink received signal processing at the wireless communication device 14, FIG. 3 illustrates a WCDMA/HSPA processing method for a single cell scenario. Alternatively, FIG. 3 could represent a scenario with one serving cell and the interference from other cells modeled as white noise. The illustrated processing begins with partitioning the channelization codes represented in the received signal into two sets: those assigned to high-speed service (set $S_d$) and those not assigned to the high-speed service (set $S_r$) (Step 100).

The circuit block 45 can be used to generate individual, per-code estimates $(\tilde{A}_{K\text{-}D}^2 \ldots \tilde{A}_{K\text{-}1}^2)$ and $(\hat{N}_{0,K\text{-}D} \ldots \hat{N}_{0,K\text{-}1})$ (Step 102). It may be remembered from Eq. (10) that $\tilde{A}_k^2 = \gamma_k^j$ where $\gamma_k^j$ is the channelization code power for the $k^{th}$ code for the $j^{th}$ transmitter. Thus, Step 102 may be understood as generating $\gamma_k^0$ and $\hat{N}_{0,k}$ for the codes in set $S_r$.

Continuing, the method includes forming $R_f(\tilde{g}^0)$ and $R_n$ as described above—see, e.g., the description accompanying and computing $\tilde{h}^0$ via $$\tilde{h}^0 = \frac{1}{R}\sum_{m=0}^{R-1} x_p^0(m) s_p^*(m)$$

or other channel estimation technique (Step 104). Then, after initializing the code index k=0 (Step 106), processing continues with the estimation of the data correlation matrix $\hat{R}_{d,k}^0$ using Eq. (13) for the $k^{th}$ code in $S_d$ (Step 108). The index is then incremented, i.e., k=k+1 (Step 110). If k equals K−D (Step 112), the index-based incrementing stops. Otherwise, these processing steps are repeated for the next $k^{th}$ code.

Upon calculation of $\hat{R}_{d,k}^0$ for all k, processing continues with the computation of $$\hat{R}_d = \frac{1}{K-D}\sum_{m \in S_d} \hat{R}_{d,m}^0$$

(Step 114) for formulation of a least squares problem exemplified in Eq. (14), but with $\hat{R}_d$ used in place of $\hat{R}_{d,k}^0$ (Step 116). The LSE solution yields the channel code powers $\gamma_{high\text{-}speed}$ for all codes in set $S_d$ and yields the corresponding noise variance $\hat{N}_{0,high\text{-}speed}$. As an optional processing step, the code power estimation circuit 18 may be configured to divide $\gamma_{high\text{-}speed}$ by K (not shown in the method flow diagram). Also, the code power estimation circuit 18 may be configured to obtain $\hat{N}_0$ via $$\hat{N}_0 = \lambda \hat{N}_{0,high\text{-}speed} + \frac{1-\lambda}{D}\sum_{m \in S_r} \hat{N}_{0,m}, \text{ where } \lambda = (K-D)/K$$

(e.g., a weighted average).

With the above example in mind, in one or more embodiments taught herein for a method of code power estimation based on joint processing includes jointly determining channelization code power estimates for at least two channelization codes used in a received CDMA signal based on the measured correlations. More particularly, joint determination comprises forming a weighted average from the measured correlations determined for two or more channelization codes, and determining the channelization code power estimates based at least in part on the weighted average. In at least one such embodiment, the method further comprises determining weights for forming the weighted average based on knowledge of relative channelization code power allocations for the two or more channelization codes. That is, the receiver (at the base station 12 or wireless communication device 14) may have knowledge of the relative power allocations for two or more data channel codes of interest, and may use such knowledge to determine one data channel code power as a function of another one, or may determine a common power scale factor, and then use that common power scale factor along with knowledge of code power allocation relationships to determine individual data code powers for one or more data channels of interest in the received signal.

For example, for uplink scenarios, the base station 12 generally has more information about code powers (as compared to the typical downlink receiver scenario) and the code power estimation circuit 16 can be configured to exploit this code power knowledge in its estimation of channelization code powers. A WCDMA uplink signal, for example, includes control channels, such as the DPCCH (Dedicated Physical Control Channel), HS-DPCCH (High-Speed Dedicated Physical Control Channel), and E-DPCCH (Enhanced Dedicated Physical Control Channel), and data channels, such as DPDCH (Dedicated Physical Data Channel) and E-DPDCH (Enhanced Dedicated Physical Data Channel). The relative amplitude scaling for these channels is signaled or can be derived once the base station 12 knows the transport format used by the wireless communication device 14.

Commonly, the relative amplitudes for DPCCH, HS-DPCCH, and E-DPCCH, denoted as $\beta_s$, $\beta_{hs}$, and $\beta_{ec}$, respectively, are signaled. The relative amplitudes for the data channel(s) can be derived, e.g., by the code power estimation circuit 16, once the transport format is known. Typically, a data channel is configured to support a transport format combination set (TFCS) consisting of a number of transport format combinations (TFCs). An example TFCS is given in the table illustrated in FIG. 4. There are three TFCs in this TFCS. Each TFC is associated with a spreading factor, a number of data codes used, and a relative code amplitude for each data code.

In any transmission time interval (TTI), any of these TFCs may be used. The wireless communication device 14 signals the TFC in use through control signaling, namely through use of a TFC indicator (TFCI). Thus, after decoding TFCI, the base station 12 knows the relative code amplitudes in the data (code) branches. The control channels (DPCCH, HS-DPCCH, E-DPCCH) occupy a different code branch from the data branches. Thus, the total power of the control branch is given by $P(\beta_c^2+\beta_{hs}^2+\beta_{ec}^2)$, where P is constantly adjusted by power control. If TFC1 is in use, the code powers for the eight code branches are $(P(\beta_c^2+\beta_{hs}^2+\beta_{ec}^2), P\beta_1^2, 0, 0, 0, 0, 0, 0)$. If TFC2 is in use, the code powers for the four code branches are $(P(\beta_c^2+\beta_{hs}^2+\beta_{ec}^2), P\beta_2^2, 0, 0)$. Similarly, if TFC3 is used, the code powers for the 4 code branches are $(P(\beta_c^2+\beta_{hs}^2+\beta_{ec}^2), P\beta_3^2, P\beta_3^2, 0)$. In any of these cases, the code powers are mutually related via the amplitude scaling factors, i.e., the $\beta$ values.

Using Eq. (10), these code power values can be translated to the $\gamma$ values as follows: for TFC1, $(\kappa(\beta_c^2+\beta_{hs}^2+\beta_{ec}^2), \kappa\beta_1^2, 0, 0, 0, 0, 0, 0)$; for TFC2, $(\kappa(\beta_c^2+\beta_{hs}^2+\beta_{ec}^2), \kappa\beta_2^2, 0, 0)$; and for TFC3, $(\kappa(\beta_c^2+\beta_{hs}^2+\beta_{ec}^2), \kappa\beta_3^2, \kappa\beta_3^2, 0)$. Here, $\kappa$ is a scaling factor common to all code branches. With the knowledge of the $\beta$ values, the code powers can be estimated as follows: estimate the $\gamma$ values for each code, and use those results to obtain an estimate of the $\kappa$ value from each code's $\gamma_k^j$ estimate; average all the K estimates to obtain a final estimate of $\hat{\kappa}$. The code power estimation circuit 16 thus may be configured to obtain final estimates of $\gamma_k^j$ based on the $\beta$ values and the final estimate of $\hat{\kappa}$.

Alternatively, the procedure described in FIG. 3 for downlink signal processing can be used. However, the base station 12 still can use the knowledge of the relative power to formulate a weighted average of data correlation:

$$\hat{R}_d = \frac{\sum_m w_m \hat{R}_{d,m}^0}{\sum_m w_m}, \qquad \text{Eq. (15)}$$

where the weighting factor for code branch k can be proportional to the relative power scaling factor. Further, even if the base station 12 has not decoded the TFCI, it still has some knowledge about code powers. For example, with the TFCs in the table illustrated in FIG. 4, the base station 12 knows that some of the code branches will always have zero code power. In this case, the $\gamma_k^j$ values for those code branches can be set to zero.

With the above processing aspects representing a particular non-limiting example, those skilled in the art should appreciate that the joint estimation processing taught herein for determining channelization code power estimates broadly comprises despreading a received CDMA signal using one or more channelization codes used for data signals in the received CDMA signal to obtain despread data values for each of the one or more channelization codes—e.g., despread data values (symbols) are generated via despreading (correlation) processing for one or more data channels in the received signal. Processing further includes measuring correlations between the despread data values for each of the one or more channelization codes.

In one or more embodiments, despreading the received CDMA signal comprises, for each of one or more channelization codes, obtaining despread data values for each of two or more correlation processing delays. In general, a correlation processing delay represents the delay position of the correlator(s) used to obtain a particular stream of despread data values from the received (composite) signal. One or more such delays may be aligned with, for example, at least some of the propagation path delays determined for the received signal. Thus, for a given data channel, a first correlator produces despread data values at a first processing delay and a second correlator produces despread data values for the same data channel but at a different processing delay. For each data channel of interest, multiple correlators (also referred to as despreaders or fingers) may be used to obtain despread values at different relative delays. In at least one such embodiment, measuring correlations between the despread data values associated with each of the one or more channelization codes comprises, for each of the one or more channelization codes, determining cross-correlations of the despread data values between the two or more correlation processing delays, e.g., cross-correlating despread data samples taken at a given processing delay with corresponding despread data samples taken for the same data channel at the same or a different processing delay. Samples at any given delay may be cross-correlated with corresponding samples taken at any number of other delays.

In any case, the method broadly continues with jointly determining channelization code power estimates for at least two channelization codes used in the received CDMA signal based on the measured correlations. In at least one particular embodiment of joint estimation of channelization code powers, joint parameter estimation exploits the fact that $$\alpha^j = \frac{1}{SF}\sum_{k=0}^{K-1}\gamma_k^j. \qquad \text{Eq. (16)}$$

Using Eq. (16) and assuming a particular base station 12 is the serving base station for the high-speed user, correspondingly denoted as base station 0, Eq. (14) can be rewritten as $$\hat{R}_{d,k}^0 \approx \sum_{m=0}^{K-1}\frac{\gamma_m^0}{SF}R_I(\tilde{g}^0) + \sum_{q=1}^{J-1}\alpha^q R_I(\tilde{g}^q) + N_0 R_n + \gamma_k^0 \tilde{h}^j(\tilde{h}^j)^H. \qquad \text{Eq. (17)}$$

One may observe that Eq. (17) still describes a problem that can be solved using a least squares approach. The only difference is that instead of J+2 unknowns there are now J+K unknowns. This means that more equations are needed than in the first embodiment presented herein to get a good least squares solution, which generally is not a problem in a number of contexts, including an WCDMA/HSPA scenario with a dispersive channel.

In one particular approach to this embodiment of joint estimation, the code power estimation circuit 16 can be configured to ignore the common scaling factor for the codes of the high-speed data user, estimate J+K parameters, then average the K−D results that correspond to the high-speed user. However, in at least some instances, this approach may not be preferred because the error in parameter estimation is directly related to the number of parameters estimated.

Figure 5:
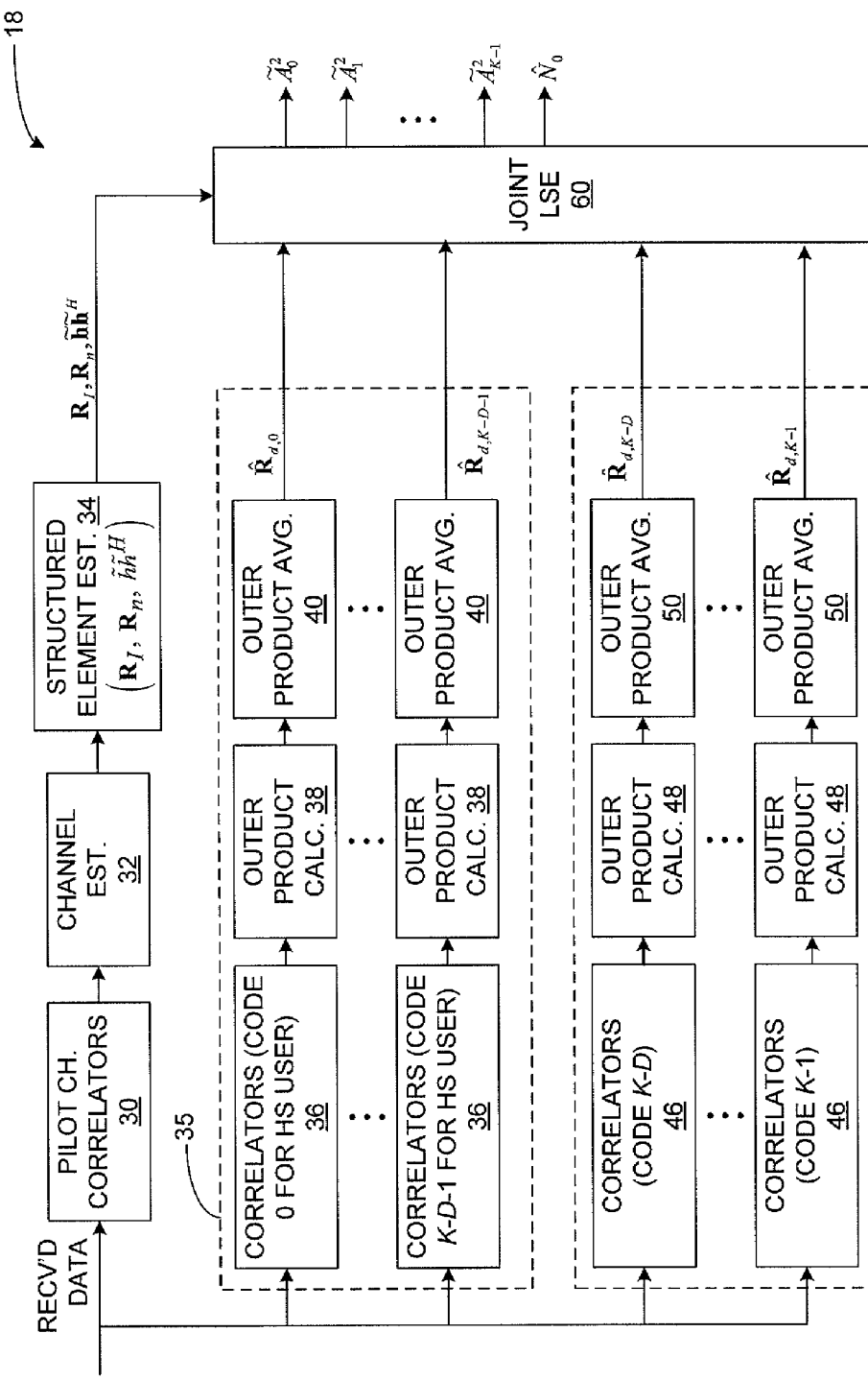
FIG. 5 is a block diagram of another embodiment of a communication receiver, or at least a portion thereof, such as may be implemented, for example, in the wireless communication device and/or base station of FIG. 1 for joint determination of channelization code powers.

In another approach to this embodiment of joint estimation, the code power estimation circuit 16 can be configured to exploit the fact that the data code powers are identical for the high-speed user. Terms in Eq. (17) thus can be combined to reduce the dimensionality of the estimation problem to J+D+1. FIG. 5 illustrates one embodiment of a functional circuit arrangement that may be implemented at the base station 12, for example, for carrying out such processing. As in FIG. 2, FIG. 5 describes a single user/cell scenario, or a scenario where the interference from other users/cells is modeled as white noise. One may note that many or most of the same circuit elements introduced and described in the context of FIG. 2 appear in FIG. 5. However, FIG. 5 includes a "larger" LSE estimator 60 rather than the individual LSE estimators 44 and 52 of FIG. 2. The LSE estimator 60 is configured to perform least squares fitting based on considering all of $R_{d,0}$ through $\hat{R}_{d,K-D-1}$ and $\hat{R}_{d,K-D}$ through $\hat{R}_{d,K-1}$ together in the LSE process.

Figure 6:
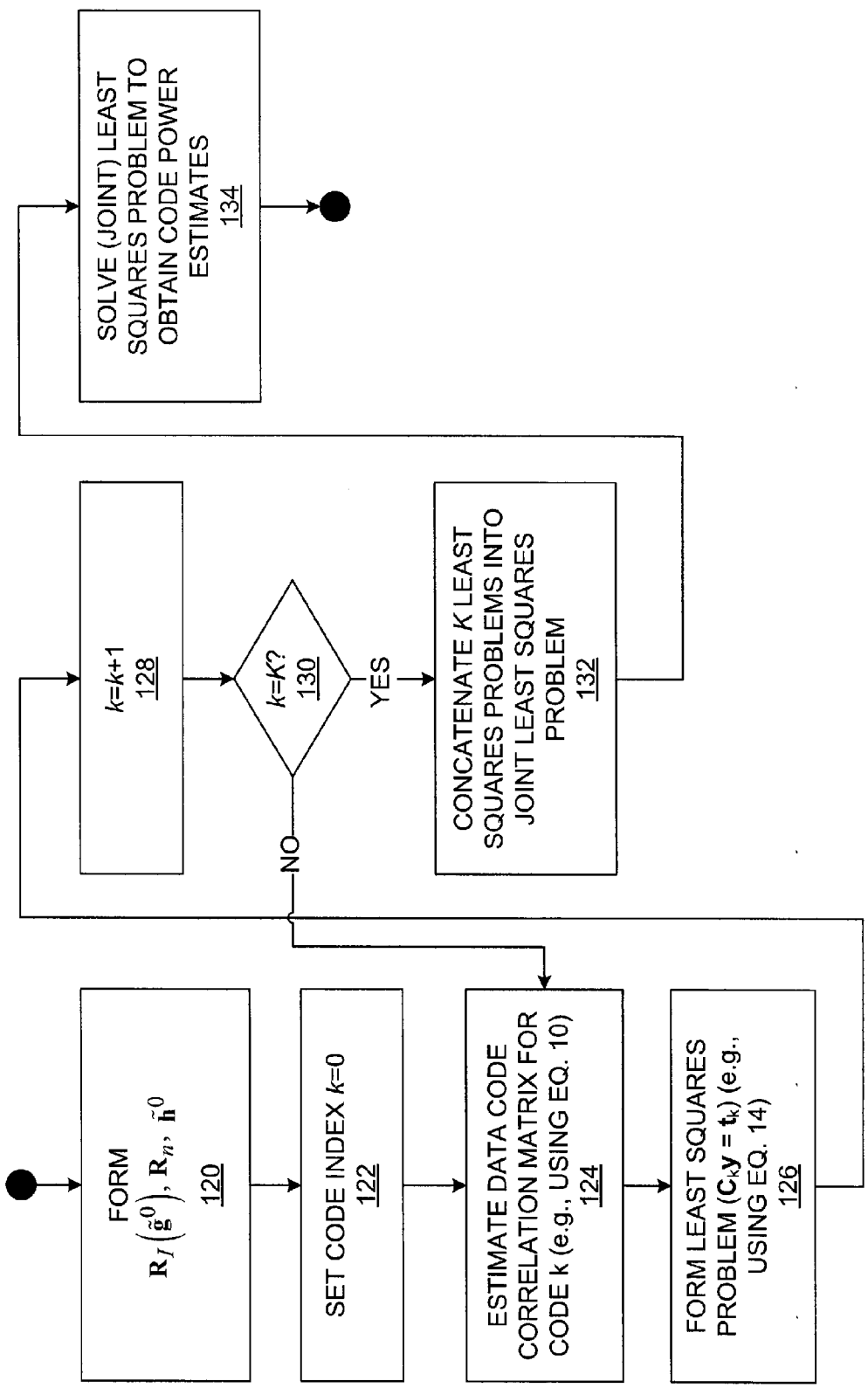
FIG. 6 is a logic flow diagram for another embodiment of joint determination of channelization code powers.

FIG. 6 illustrates processing that can be supported via the circuitry shown in FIG. 5, and begins with forming $R_f(\tilde{g}^0)$ and $R_n$, and computing $\hat{h}^0$ (e.g., via $$\hat{h}^0 = \frac{1}{R}\sum_{m=0}^{R-1} x_p^0(m) s_p^*(m)$$

or other channel estimation technique) (Step 120). Processing continues with initializing the code index k=0 (Step 122), and estimating the data correlation matrix corresponding to code k using, for example, Eq. (13) (Step 124). Processing continues with forming the corresponding least squares problem $C_k y = t_k$ from Eq. (17) (Step 126). Here $y=[\gamma_0^0, \gamma_1^0, \ldots, \gamma_{K-1}^0, N_0]^T$. Processing continues with incrementing the code index k=k+1 (Step 128), and determining whether k equals K (Step 130).

If not, Steps 124 and 126 are repeated for the next code. If so, processing continues with concatenation of K least squares problems into a joint least squares problem (Step 132), such as $$\begin{bmatrix} C_0 \\ C_1 \\ \vdots \\ C_{K-1} \end{bmatrix} y = \begin{bmatrix} t_0 \\ t_1 \\ \vdots \\ t_{K-1} \end{bmatrix} \quad \text{Eq. (18)}$$

$$By = v$$

Carrying out Eq. (18) yields $[\gamma_0^0, \gamma_1^0, \ldots, \gamma_{K-1}^0, N_0]^T$, representing the vector of channel code powers γ for the codes of interest and the corresponding noise variance (Step 134). While not illustrated, processing also may include dividing $\gamma_k^0$ by K∀k. As the elements in y are purely real, each complex-valued equation is treated as two real equations (equating real and imaginary parts) in the fitting process. Some equations may be omitted, such as the off-diagonal equations. Thus, fitting matrices may involve fitting a subset of elements.

For the uplink case, the $\gamma_k^j$ values may be related in terms of their relative power allocations through the β values and it suffices to estimate a common scaling factor κ. By replacing $\gamma_k^0$ with $\kappa v_k^0$ in Eq. (17), one can solve for κ and $N_0$. Note that $v_k^0$ is known once the TFCI is decoded at the base station 12. For example, if TFC2 is used according to the earlier mentioned TFCS, then $v_0^0 = \beta_c^2 + \beta_{hs}^2 + \beta_{ec}^2$, $v_2^0$ and $v_3^0 = 0$. If TFCI is not available, the base station 12 still knows that some of the code branches will always have zero code power. In this case, the $\gamma_k^j$'s for these code branches can be set to zero. Doing so advantageously reduces the number of variables that need to be estimated.

With the immediately foregoing example in mind, it should be understood that the joint determination of channelization code powers relies on measuring data channel code correlations by determining matrices of data correlations for each of a plurality of data channel codes over one or more time slots. With that, jointly determining channelization code power estimates for at least two channelization codes used in the received CDMA signal comprises jointly fitting the matrices of data correlations in an LSE estimation process to determine code power estimates corresponding to the plurality of data channel codes. In at least one such embodiment, processing includes determining a common scaling factor for the plurality of data channel codes and determining the code power estimates as a function of the common scaling factor and known code power relationships.

In general, a communication receiver can be configured to estimate channelization code powers for a received CDMA signal. The communication receiver 20 (and more particularly, the included code power estimation circuit 18) represent a non-limiting example of an appropriately configured communication receiver. With that in mind, it should be understood that the communication receiver in one or more embodiments comprises one or more processing circuits configured to despread a received CDMA signal using one or more channelization codes used for data signals in the received CDMA signal to obtain despread data values for each of the one or more channelization codes. The processing circuit(s) are further configured to measure correlations between the despread data values for each of the one or more channelization codes, and jointly determine channelization code power estimates for at least two channelization codes used in the received CDMA signal based on the measured correlations.

As illustrated by way of example in FIG. 2 or 5, the one or more processing circuits may comprise correlators (e.g., correlators 36 and 46) to obtain despread data values, correlation measurement circuits (e.g., circuits 38/40 and 48/50) to obtain the measured correlations, and one or more LSE estimation circuits (e.g., LSE estimators 44 and 52 in FIG. 2, and LSE estimator 60 in FIG. 5) to determine the channelization code power estimates as a function of the measured correlations. In one particular embodiment, the correlation measurement circuits include a joint processing circuit (e.g., the weighted averaging circuit 42 in FIG. 2) to obtain joint correlation measurements reflecting a weighted averaging of correlation measurements for two or more data channel codes. In another embodiment, one or more least squares error (LSE) estimation circuits (e.g., LSE estimator 60 in FIG. 5) are configured to determine the channelization code power estimates in a joint fitting process that includes the measured correlations for a plurality of data channel codes. In FIG. 5, one sees that the joint fitting process involves a plurality of data correlation matrices determined from the despread data values obtained for a plurality of data channel codes in the received signal. That is, in at least one embodiment, data correlation matrices are determined for each in a plurality of two or more data channel codes in the received signal, and these matrices are jointly fitted in a least squares estimation process to determine code power estimates corresponding to the plurality of data channel codes. Such processing may include determining a common scaling factor for the plurality of data channel codes and determining the code power estimates as a function of the common scaling factor and known code power relationships.

With these and other variations and extensions in mind, those skilled in the art will appreciate that the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of estimating channelization code powers for a received CDMA signal comprising:
   despreading the received CDMA signal using two or more channelization codes used for data signals in the received CDMA signal to obtain despread data values for each of the two or more channelization codes;
   measuring correlations between the despread data values for each of the two or more channelization codes; and
   jointly determining channelization code power estimates for at least two channelization codes used in the received CDMA signal based on the measured correlations.

2. The method of claim 1, wherein jointly determining channelization code power estimates for at least two channelization codes used in the received CDMA signal based on the measured correlations comprises determining code power scaling factors relating the at least two channelization codes to a pilot code in terms of relative power.

3. The method of claim 1, wherein despreading the received CDMA signal comprises, for each of the two or more channelization codes, obtaining despread data values for each of two or more correlation processing delays.

4. The method of claim 3, wherein measuring correlations between the despread data values associated with each of the two or more channelization codes comprises, for each of the two or more channelization codes, determining cross-correlations of the despread data values between the two or more correlation processing delays.

5. The method of claim 1, wherein measuring correlations between the despread data values for each of the two or more channelization codes comprises determining matrices of data correlations for each of a plurality of data channel codes over one or more time slots, and wherein jointly determining channelization code power estimates for at least two channelization codes used in the received CDMA signal based on the measured correlations comprises jointly fitting elements in the matrices of data correlations in a least squares estimation process to determine code power estimates corresponding to the plurality of data channel codes.

6. The method of claim 5, further comprising determining a common scaling factor for the plurality of data channel codes and determining the code power estimates as a function of the common scaling factor and known code power relationships.

7. The method of claim 1, wherein jointly determining channelization code power estimates for at least two channelization codes used in the received CDMA signal based on the measured correlations comprises forming a weighted average from the measured correlations determined for two or more channelization codes, and determining the channelization code power estimates based at least in part on the weighted average.

8. The method of claim 7, further comprising determining weights for forming the weighted average based on knowledge of relative channelization code power allocations for the two or more channelization codes.

9. The method of claim 1, wherein the received CDMA signal is a received downlink signal transmitted using a first set of channelization codes for a defined data service and one or more remaining channelization codes for other data and control signaling, and wherein said jointly determining the channelization code power factors for at least two channelization codes used in the received CDMA signal based on the measured correlations comprises jointly determining the channelization code power factors for channelization codes in the first set, while individually determining channelization code power factors as needed for the remaining channelization codes.

10. The method of claim 1, wherein jointly determining channelization code power estimates for at least two channelization codes used in the received CDMA signal based on the measured correlations includes simplifying the determination of channelization code power estimates by setting channelization power estimates to zero or otherwise omitting them from consideration for code branches known to be zero.

11. The method of claim 1, wherein jointly determining channelization code power estimates for at least two channelization codes used in the received CDMA signal based on the measured correlations includes estimating code powers at a given level of a code tree of interest such that the code power estimate for a given code branch represents code power allocated at that branch level, or a total of code power allocations made below that branch level for that given branch.

12. A communication receiver for estimating channelization code powers for a received CDMA signal, said communication receiver comprising one or more processing circuits, including:
    correlators configured to despread the received CDMA signal using two or more channelization codes used for data signals in the received CDMA signal to obtain despread data values for each of the two or more channelization codes;
    correlation measurement circuits configured to measure correlations between the despread data values for each of the two or more channelization codes; and
    one or more least squares error estimation circuits configured to jointly determine channelization code power estimates for at least two channelization codes used in the received CDMA signal based on the measured correlations.

13. The communication receiver of claim 12, wherein the correlation measurement circuits include a joint processing circuit to obtain joint correlation measurements reflecting a weighted averaging of correlation measurements for two or more data channel codes.

14. The communication receiver of claim 12, wherein the one or more least squares error estimation circuits are configured to determine the channelization code power estimates in a joint fitting process that includes the measured correlations for a plurality of data channel codes.

15. The communication receiver of claim 12, wherein the communication receiver is configured to jointly determine channelization code power estimates for at least two channelization codes used in the received CDMA signal based on the measured correlations by determining code power scaling factors relating the at least two channelization codes to a pilot code in terms of relative power.

16. The communication receiver of claim 12, wherein the communication receiver is configured to despread the received CDMA signal by, for each of the two or more channelization codes, obtaining despread data values for each of two or more correlation processing delays.

17. The communication receiver of claim 16, wherein the communication receiver is configured to measure correlations between the despread data values associated with each of the two or more channelization codes by, for each of the two or more channelization codes, determining cross-correlations of the despread data values between the two or more correlation processing delays.

18. The communication receiver of claim 12, wherein the communication receiver is configured to measure correlations between the despread data values for each of the two or more channelization codes by determining matrices of data correlations for each of a plurality of data channel codes over one or more time slots, and to jointly determine channelization code power estimates for at least two channelization codes used in the received CDMA signal based on the measured correlations by jointly fitting elements in the matrices of data correlations in a least squares estimation process to determine code power estimates corresponding to the plurality of data channel codes.

19. The communication receiver of claim 18, wherein the communication receiver is configured to determine a common scaling factor for the plurality of data channel codes and determine the code power estimates as a function of the common scaling factor and known code power relationships.

20. The communication receiver of claim 12, wherein the communication receiver is configured to jointly determine channelization code power estimates for at least two channelization codes used in the received CDMA signal based on the measured correlations by forming a weighted average from the measured correlations determined for two or more channelization codes, and determining the channelization code power estimates based at least in part on the weighted average.

21. The communication receiver of claim 20, wherein the communication receiver is configured to determine weights for forming the weighted average based on knowledge of relative channelization code power allocations for the two or more channelization codes.

22. The communication receiver of claim 12, wherein the received CDMA signal is a received downlink signal transmitted using a first set of channelization codes for a defined data service and one or more remaining channelization codes for other data and control signaling, and wherein the communication receiver is configured to jointly determine the channelization code power factors for at least two channelization codes used in the received CDMA signal based on the measured correlations by jointly determining the channelization code power factors for channelization codes in the first set, while individually determining channelization code power factors as needed for the remaining channelization codes.

23. The communication receiver of claim 12, wherein the communication receiver is configured to jointly determine channelization code power estimates for at least two channelization codes used in the received CDMA signal based on the measured correlations based at least in part on simplifying the determination of channelization code power estimates by setting channelization power estimates to zero or otherwise omitting them from consideration for code branches known to be zero.

24. The communication receiver of claim 12, wherein the communication receiver is configured to jointly determine channelization code power estimates for at least two channelization codes used in the received CDMA signal based on the measured correlations based at least in part on estimating code powers at a given level of a code tree of interest such that the code power estimate for a given code branch represents code power allocated at that branch level, or a total of code power allocations made below that branch level for that given branch.

* * * * *

UNITED STATES PATENT AND TRADEMARK OFFICE
CERTIFICATE OF CORRECTION

| | | |
|---|---|---|
| PATENT NO. | : 7,995,641 B2 | Page 1 of 1 |
| APPLICATION NO. | : 11/935840 | |
| DATED | : August 9, 2011 | |
| INVENTOR(S) | : Bottomley et al. | |

It is certified that error appears in the above-identified patent and that said Letters Patent is hereby corrected as shown below:

In Column 5, Line 18, delete "NOR" and insert -- $N_oR$ --, therefor.

In Column 5, Line 51, in Equation (1), delete "$\hat{R}_d \approx \alpha R_1(\tilde{g}) + N_0 R_n + \gamma \tilde{h}\tilde{h}^H$,," and insert -- $\hat{R}_d \approx \alpha R_1(\tilde{g}) + N_0 R_n + \gamma \tilde{h}\tilde{h}^H$. --, therefor.

In Column 5, Line 52, delete "$R_1(\hat{g})$" and insert -- $R_1(\tilde{g})$ --, therefor.

In Column 6, Line 57, delete "$\gamma_k^j$" and insert -- $\gamma_k^j$ --, therefor.

In Column 9, Lines 42-43, delete "(set $S_d$)" and insert -- (set $S_d$), --, therefor.

In Column 10, Line 13, delete "$\hat{N}_{0,high\text{-}speed}$" and insert -- $\hat{N}_{0,high\text{-}speed}$. --, therefor.

In Column 10, Line 64, delete "$\beta_8$," and insert -- $\beta_{c'}$ --, therefor.

In Column 14, Line 2, delete "$v_0^0 = \beta_c^2 + \beta_{hs}^2 + \beta_{ec}^2, v_2^0$" and insert -- $v_0^0 = \beta_c^2 + \beta_{hs}^2 + \beta_{ec}^2, v_1^0 = \beta_2^2, v_2^0 = 0,$ --, therefor.

In Column 14, Line 3, delete "$v_3^{0=0}$." and insert -- $v_3^0 = 0.$ --, therefor.

Signed and Sealed this
Tenth Day of January, 2012

David J. Kappos
*Director of the United States Patent and Trademark Office*